United States Patent [19]

Niebylski

[11] Patent Number: 4,910,173

[45] Date of Patent: Mar. 20, 1990

[54] PRECERAMIC COMPOSITIONS AND CERAMIC PRODUCTS

[75] Inventor: Leonard M. Niebylski, Birmingham, Mich.

[73] Assignee: Ethyl Corporation, Richmond, Va.

[21] Appl. No.: 338,218

[22] Filed: Apr. 14, 1989

[51] Int. Cl.$^4$ ............................................. C04B 35/58
[52] U.S. Cl. ....................................... 501/97; 501/88; 501/96
[58] Field of Search ............................ 501/96, 97, 88

[56] References Cited

U.S. PATENT DOCUMENTS 4,097,294  6/1978  Rice et al. .............................. 106/43
4,174,331  11/1979  Myles .................................... 501/95
4,581,468  4/1986  Paciorak et al. ..................... 556/403

Primary Examiner—William R. Dixon, Jr.
Assistant Examiner—Miriam Sohn
Attorney, Agent, or Firm—Patricia J. Hogan

[57] ABSTRACT

Preceramic compositions which have particular utility in providing protective ceramic coatings having low moisture sensitivity on carbon/carbon composites, graphite, carbon fibers, and other normally oxidizable materials are prepared by dispersing about 0.1–1.0 part by weight of a Group IIA metal salt with an organoborosilazane polymer solution obtained by reacting about 0.25–20 parts by weight of a trialkoxy-, triaryloxy-, or tri(arylalkoxy)boroxine with one part by weight of a polysilazane in an organic solvent and, if desired, heating the dispersion to convert it to a solution.

12 Claims, No Drawings

PRECERAMIC COMPOSITIONS AND CERAMIC PRODUCTS

FIELD OF THE INVENTION

This invention relates to ceramic materials derived from polysilazanes and more particularly to such materials which are useful in protecting substrates that are normally susceptible to oxidative deterioration.

BACKGROUND

It is known that many materials, such as carbon/carbon composites, carbon fibers, graphite, and certain metals, have properties which make them attractive for use in aerospace and other applications in which their susceptibility to oxidative deterioration at elevated temperatures is a serious disadvantage. It would be desirable to find a means of protecting those materials from oxidation at high temperatures, and it has been proposed to provide such protection with ceramic coatings. However, known ceramic coatings have proved to be inadequate.

Copending applications Ser. No. 242,493 (Niebylski-I), filed Sept. 9, 1988, and Ser. No. 272,481 (Niebylski-II), filed Nov. 17, 1988, teach organoborosilazane polymers which can be coated onto substrates and pyrolyzed to ceramics to provide improved protection from oxidative deterioration at elevated temperatures. However, the utility of the polymers is limited by the moisture sensitivity of the ceramics obtained from them.

SUMMARY OF THE INVENTION

An object of this invention is to provide novel preceramic compositions.

Another object is to provide such compositions which can be converted to ceramic coatings capable of protecting oxidizable substrates from oxidative deterioration at elevated temperatures.

A further object is to provide such compositions which can be pyrolyzed to ceramics having low moisture sensitivity.

These and other objects are attained by dispersing about 0 1–1.0 part by weight of a Group IIA metal salt in an organoborosilazane polymer solution obtained by reacting about 0.25–20 parts by weight of a trialkoxy-, triaryloxy-, or tri(arylalkoxy)boroxine with one part by weight of a polysilazane in an organic solvent and, if desired, heating the dispersion to convert it to a solution.

DETAILED DESCRIPTION

The organoborosilazane polymers employed in the practice of the invention are those disclosed in Niebylski-I and Niebylski-II, i.e., polymers prepared by reacting about 0.25–20 parts by weight of a trialkoxy-, triaryloxy-, or tri(arylalkoxy)boroxine with one part by weight of polysilazane.

The polysilazane which is reacted with the boroxine may be any polysilazane that is soluble in common organic solvents, such as aliphatic or aromatic hydrocarbons, dialkyl or alicyclic ethers, etc.; and it may be, e.g., a polysilazane of any of U.S. Pat. Nos. 4,397,828 (Seyferth et al.-I), 4,482,669 (Seyferth et al.-II), 4,645,807 (Seyferth et al.-III), 4,650,837 (Seyferth et al.-IV), and 4,659,850 (Arai et al.), the teachings of all of which are incorporated herein in toto by reference. However, it is preferably a polysilazane of the type taught by Seyferth et al.-II, i.e., a polysilazane prepared by reacting an organodihalosilane with ammonia, treating the ammonolysis product with a basic catalyst which is capable of deprotonating an NH group that is adjacent to an SiH group, and quenching the resultant product with an electrophilic quenching reagent, a mixture of such polysilazanes, or, alternatively, an oligomeric ammonolysis product formed as an intermediate in the process of Seyferth et al.-II and isolated as in Seyferth et al.-I. For example, it may be one or more polysilazanes prepared by reacting methyldichlorosilane with ammonia, treating the ammonolysis product with potassium hydride, and quenching the resultant product with methyl iodide or dimethylchlorosilane; or it may be one or more polysilazanes prepared by reacting methyldichlorosilane with ammonia and isolating the ammonolysis product.

The boroxine reactant used in preparing the organoborosilazane polymer is a compound corresponding to the formula:

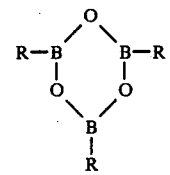

wherein R is an alkoxy, aryloxy, or arylalkoxy group, preferably an alkoxy, phenoxy, alkylphenoxy, phenalkoxy, or alkylphenalkoxy group in which any alkyl or alkoxy group contains 1–6 carbons, such as the trimethoxy-, triethoxy-, tripropoxy-, tributoxy-, tripentoxy-, trihexoxy-, triphenoxy-, tritolyloxy-, tri(2-ethylphenoxy)-, tribenzyloxy-, triphenethoxy-, tri(3-phenylpropoxy)-, tri(4-phenylbutoxy)-, tri(5-phenylpentoxy)-, and tri(6-phenylhexoxy)boroxines, the corresponding triphenalkoxyboroxines having non-linear alkyl chains, tritolylethoxyboroxine, etc. It is preferably trimethoxyboroxine or triphenoxyboroxine.

Regardless of the particular boroxine used, the amount employed is about 0.25–20 parts per part by weight of the polysilazane. However, when the boroxine is a trialkoxyboroxine, it is generally preferred to use about 1–6, most preferably about 3–4 parts per part by weight of polysilazane; and, when the boroxine is a triaryloxyboroxine, it is generally preferred to employ about 1–10, most preferably about 6–8 parts per part by weight of polysilazane.

To prepare the organoborosilazane polymers, the neat boroxine reactant (if sufficiently low melting) or a solution thereof in an organic solvent is added to a solution of a polysilazane in an organic solvent to initiate an exothermic reaction which is preferably controlled to a temperature below 50° C. for a period of time sufficient to allow the formation of an organoborosilazane polymer. In a preferred embodiment of the invention, the polysilazane is used as a clear solution having a solids content of about 10–40%, preferably about 20% by weight; and the total amount of solvent employed is such as to provide an organoborosilazane polymer solids content of about 5–75%, preferably about 40–60% by weight.

The solvent employed for the polysilazane and optionally also the boroxine may be any suitable organic solvent, such as hexane, heptane, and other aliphatic hydrocarbons; benzene, toluene, xylene, and other aromatic hydrocarbons; cyclohexanone, 1-methyl-2-pyrrolidone, and other ketones; etc.; and mixtures thereof.

The Group IIA metal salt which is mixed with the organoborosilazane polymer is a salt, such as a fluoride, tetrafluoroborate, oxide, oxyfluoride, oxynitride, acetate, benzoate, etc., of beryllium, magnesium, calcium, strontium, or barium. The calcium and barium salts are preferred, with the fluorides and tetrafluoroborates thereof being particularly preferred.

As indicated above, the dispersions of the invention may be heated to convert them to solutions if desired. It is believed that thermal treatment of the dispersions causes the salt to react with the organoborosilazane polymer, although it is possible that heating merely solubilizes the salt. When solution formation is desired, it is generally accomplished by heating the dispersion at a temperature in the range of about 120°–150° C. for a suitable time, e.g., about 12-24 hours.

The novel dispersions and solutions of the invention are preceramic materilas which are useful for making ceramic fibers, filaments, flakes, powders, films, coatings, mats, woven fabrics, slabs, sleeves, structural composites, and other shaped articles; and, like other preceramic materials, they may be used in combination with other ingredients, such as lubricants or ceramic powders, fibers, or whiskers, etc., when appropriate.

An application in which they find particular utility is as coating compositions for normally oxidizable materials, especially those which need protection from oxidative deterioration at elevated temperatures. (Such materials include, e.g., fibers, tows, hanks, mats, and composites of carbon; carbon or graphite slabs, rods, and structures; and oxidizable metals, such as magnesium, aluminum, silicon, niobium, molybdenum, lanthanum, hafnium, tantalum, titanium, tungsten, and the metals of the lanthanide and actinide series.) When used in such an application in which the substrate is porous, the compositions can also serve as infiltrants when they are relatively dilute; and infiltration can be prevented or minimized by using more concentrated coating compositions.

In addition to providing protection from oxidative deterioration, the coating compositions can also serve to improve the physical properties and thermal stability of substrates, such as those mentioned above, silica foams, ceramic cloths (e.g., cloths formed from alumina, silica, and/or lithia), etc.

The coating compositions are also useful for patching ceramic coatings formed from the same or different formulations.

Another particularly notable utility of the compositions is as adhesive compositions which can be coated onto one or both of two surfaces to be adhered and then dried and pyrolyzed to form a ceramic bond.

When the compositions are to be used to provide protective ceramic coatings on substrates, the surfaces to be coated are usually cleaned prior to the application of the coating composition in order to improve the bonding of the ceramic coating to the substrate. The bonding can sometimes be further improved by pre-etching the surfaces to be coated.

The coating compositions of the invention are generally solutions or dispersions in organic solvents of about 5-75%, preferably about 40-60% by weight of dispersed or solubilized solids. These compositions may be applied to the substrates in any suitable manner, such as by spraying, swabbing, or brushing, to form coatings having the desired thickness, generally a thickness of up to about 1000 micrometers, frequently a thickness of about 10-250 micrometers. A coating of a desired thickness can be achieved by applying a single coating of that thickness or by applying the precursor coating composition in multiple thinner layers. For example, when relatively thick coatings are desired, it is preferred to apply the coating composition in layers of about 25-100 micrometers, each layer being dried by driving off the solvent before the next layer is applied.

When temperatures as high as about 200°–250° C. are used to drive off high boiling solvents, some pyrolysis of the preceramic material is initiated during the drying of the coating composition. However, higher temperatures, i.e., about 675°–900° C., preferably about 825°–875° C., are required to convert the preceramic coating to a ceramic coating. This pyrolysis may be delayed until the final desired thickness of preceramic coating has been deposited, even when the coating is applied in multiple layers. However, when the coating is applied in multiple layers, it is generally preferred to pyrolyze each one or two layers of dried preceramic coating before applying the next layer of coating composition. The time required for the pyrolysis is generally about 1-60 minutes, depending on the particular pyrolysis temperature selected. In the preferred embodiment of the invention where the coating is applied in multiple layers, each one or two of which is pyrolyzed before the application of the next layer, and the pyrolysis temperature is about 825°–875° C., it is generally preferred to pyrolyze the first coat for only about five minutes and then to pyrolyze subsequent coats for longer times up to about 15 minutes.

After the pyrolysis, the coated substrate is cooled. Optimum results are attained when this cooling is accomplished at a rate not greater than about 50° C./minute, preferably about 20°–30° C./minute, until the substrate temperature is below 500° C., at which time further cooling may be accomplished at ambient air temperature.

Although not essential, it is preferred to keep the starting polysilazane and the organoborosilazane polymers and compositions formed from them in a dry atmosphere until a layer of ceramic has been formed because of the susceptibility of the preceramic materials to attack by water and other compounds having active hydrogens.

As already indicated, the compositions of the invention are useful in preparing a variety of ceramic objects, but the major advantage of the invention is its provision of compositions capable of protecting normally oxidizable materials from oxidative deterioration at elevated temperatures when converted to ceramics having low moisture sensitivity. This advantage is of particular importance in the protection of carbon/carbon composites, graphite, and metals used in aerospace applications, such as engine components, advanced nozzle system components, and high-temperature vehicle structures.

The following examples are given to illustrate the invention and are not intended as a limitation thereof.

EXAMPLE I

Synthesis of Polysilazane

Part A

A suitable reaction vessel was charged with 14 L of anhydrous tetrahydrofuran and cooled to about 0° C., after which 1545 g (13.43 mols) of methyldichlorosilane was added to the vessel, and stirring at about 60 rpm was begun. A slow steady stream of 1058 g (62.12 mols) of anhydrous ammonia gas was introduced into the vessel at a flow rate such that the reaction pressure was maintained at or below 400 kPa, and the reaction temperature stayed in the range of 0°–0° C. Then the reaction mixture was stirred at 0° C. for about three hours, after which the coolant flow on the vessel was shut off, and the system was put under gentle nitrogen purge to allow the reaction mass to warm to room temperature and the majority of the excess ammonia to vent off. Then the reaction vessel was pressurized with sufficient nitrogen gas to pump the product mass through a bag filter assembly into a holding tank, where it was verified that the filtrate solution was free of particulates.

Part B

The clear filtrate from Part A was discharged into a polymerization vessel and chilled to about 0° C., and a suspension of 3.6 g (0.089 mol) of potassium hydride powder in about 100 mL of anhydrous tetrahydrofuran was added to begin the polymerization reaction. The reaction mixture was maintained at 0° C. for about 8 hours and then allowed to warm gradually to about 22° C. After a total of about 26 hours of polymerization at 0°–22° C., the reaction was quenched by adding about 12.6 g (0.13 mol) of dimethylchlorosilane to the polymerization solution.

The polymer product was isolated by (1) concentrating the product solution to about 4 L of volume by vacuum distillation, (2) centrifuging the concentrated solution to obtain a clear supernatant solution and a white precipitate, (3) decanting off the supernatant solution from the precipitate, and (4) flashing off the volatiles from the supernatant solution by vacuum distillation to provide a white solid. Proton NMR spectra of the polymer in deuterated chloroform solvent had resonances consistent with those reported in Seyferth et al.-II for polysilazane and with the presence of a small amount, i.e., 2.4% by weight, of residual tetrahydrofuran.

EXAMPLE II

Synthesis of Organoborosilazane Polymer

A clear solution of four parts by weight of trimethoxyboroxine in a mixture of 0.5 part by weight of xylene and 0.5 part by weight of 1-methyl-2-pyrrolidone was slowly added to a clear solution of one part by weight of the polysilazane of Example I in a mixture of 1.5 parts by weight of xylene and 1.5 parts by weight of 1-methyl-2-pyrrolidone. An exothermic reaction occurred to form a solution of an organoborosilazane polymer.

EXAMPLE III

Synthesis of Novel Compositions

Part A

Composition A, a dispersion, was prepared by dispersing 5–7 g of a fine anhydrous barium fluoride powder in 100 g of the organoborosilazane polymer solution of Example II.

Part B

Composition B, a solution, was prepared by dispersing 5 g of a fine anhydrous barium fluoride powder in 100 g of the organoborosilazane polymer solution of Example II and stirring the composition continuously while heating it overnight at 130° C. to form a solution from which undissolved salt (about 0.8 g) was removed.

Part C

Composition C, another solution, was prepared by repeating Part B except for substituting fine calcium tetrafluoroborate powder for the barium fluoride.

EXAMPLE IV

Graphite coupons having nominal dimensions of about 3.8 cm×2.5 cm×0.3 cm were abraded to provided a smooth finish, cleaned, vacuum dried, thoroughly swab-coated in an inert atmosphere with Composition A, dried, heated at 100° C. for five minutes, heated to 150° C. at a rate of about 10° C./minute, held at 150° C. for 15–30 minutes, allowed to cool to room temperature, recoated and held at 150° C. for 30 minutes, heated to about 200°–225° C., maintained at that temperature for at least 15 minutes, and cooled to provide coupons having a coating thickness of about 0.08–0.1 mm.

The polymer coatings were then pyrolyzed to ceramic coats by heating the coated coupons to 800°–825° C., holding at that temperature for 30 minutes, and cooling to room temperature at a rate of 10°–20° C./minute.

The effectiveness of the ceramic coats thus obtained in protecting the graphite substrate from oxidation was determined by an oxidation test. The coated specimen was mounted horizontally in a half section of a silicon carbide tube which was used as a holder and which allowed over 99% of the coupon surface to be directly exposed to hot ambient convecting air. The holder and specimen were placed in a box furnace which had been preheated to 650° C. Periodically the holder and specimen were removed from the furnace and quenched in ambient air, the cooled specimen was weighed and remounted in its holder, and the holder and specimen were replaced in the heated furnace for additional heating in air. The weight loss on oxidation was determined to be only 1.8% after 24 hours, compared with a weight loss of greater than 98% when uncoated graphite coupons were subjected to the same test. This weight loss was not quite as low as the 1.0% weight loss achieved when graphite coupons coated with a ceramic derived from the organoborosilazane polymer solution of Example II were subjected to the same test. However, the coat derived from Composition A had the advantage of being hydrolytically stable, while the coat derived from the organoborosilazane polymer solution disintegrated in water.

EXAMPLE V

Example IV was repeated except that Composition B was substituted for Composition A. The ceramic coat derived from the composition was hydrolytically stable, and the weight loss on oxidation was only 1.4% after 24 hours.

EXAMPLE VI

Example IV was repeated except that Composition C was substituted for Composition A. The ceramic coat derived from the composition was hydrolytically stable, and the weight loss on oxidation was only 2.6% after 24 hours.

EXAMPLE VII

Example V was repeated except that the test temperature was 1000° C. instead of 650° C. The ceramic coat was hydrolytically stable, and the weight loss on oxidation was only 0.4% after 6 hours. This compares with a weight loss of 84% after 6 hours when graphite coupons coated with a ceramic derived from the organoborosilazane polymer solution of Example II were subjected to the same test.

It is obvious that many variations may be made in the products and processes set forth above without departing from the spirit and scope of this invention.

What is claimed is:

1. A process which comprises dispersing about 0.1–1.0 part by weight of a Group IIA metal salt in an organoborosilazane polymer solution obtained by reacting about 0.25–20 parts by weight of a trialkoxy-, triaryloxy-, or tri(arylalkoxy)boroxine with one part by weight of a polysilazane in an organic solvent.

2. The process of claim 1 wherein the salt is a fluoride, tetrafluoroborate, oxide, oxyfluoride, or oxynitride.

3. The process of claim 2 wherein the salt is calcium tetrafluoroborate.

4. The process of claim 2 wherein the salt is barium fluoride.

5. The process of claim wherein the boroxine is trimethoxyboroxine.

6. The process of claim 1 wherein the polysilazane is a polymer prepared by reacting an organodihalosilane with ammonia, treating the ammonolysis product with a basic catalyst which is capable of deprotonating an NH group that is adjacent to an SiH group, and quenching the resultant product with an electrophilic quenching reagent.

7. The process of claim 6 wherein the organodihalosilane is methyldichlorosilane and the basic catalyst is potassium hydride.

8. The process of claim 1 wherein the composition obtained by dispersing the salt in the polymer solution is heated at about 120°–150° C. until at least a portion of the salt has been solubilized.

9. The process of claim 8 wherein about 0.1–1.0 part by weight of calcium tetrafluoroborate is dispersed in an organoborosilazane polymer solution obtained by reacting about 3–4 parts by weight of trimethoxyboroxine with one part by weight of a polysilazane prepared by reacting methyldichlorosilane with ammonia, treating the ammonolysis product with potassium hydride, and quenching the resultant product with an electrophilic quenching reagent.

10. The process of claim 8 wherein about 0.1–1.0 part by weight of barium fluoride is dispersed in an organoborosilazane polymer solution obtained by reacting about 3–4 parts by weight of trimethoxyboroxine with one part by weight of a polysilazane prepared by reacting methyldichlorosilane with ammonia, treating the ammonolysis product with potassium hydride, and quenching the resultant product with an electrophilic quenching reagent.

11. A dispersion prepared by the process of claim 1.

12. A solution prepared by the process of claim 8.

* * * * *

UNITED STATES PATENT AND TRADEMARK OFFICE
CERTIFICATE OF CORRECTION

PATENT NO. : 4,910,173
DATED : March 20, 1990
INVENTOR(S) : Leonard M. Niebylski It is certified that error appears in the above-identified patent and that said Letters Patent is hereby corrected as shown below:

Column 7, claim 5, line 23, reads "claim" and should read -- claim 1 --.

Signed and Sealed this

Twenty-eighth Day of May, 1991

Attest:

HARRY F. MANBECK, JR.

Attesting Officer

Commissioner of Patents and Trademarks